(12) United States Patent
Jarabo et al.

(10) Patent No.: US 12,370,395 B2
(45) Date of Patent: Jul. 29, 2025

(54) THERMOELECTRIC TRIPPING DEVICE AND COUPLING ARRANGEMENT THEREOF

(71) Applicant: Johnson Controls Technology Company, Auburn Hills, MI (US)

(72) Inventors: Alba Garcia Jarabo, Alcala de Henares (ES); Andrea Tamagni, Monza (IT); Claudio Viscardi, Casatenovo (IT)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 1172 days.

(21) Appl. No.: 17/201,588

(22) Filed: Mar. 15, 2021

(65) Prior Publication Data

US 2021/0285681 A1    Sep. 16, 2021

Related U.S. Application Data

(60) Provisional application No. 62/990,202, filed on Mar. 16, 2020.

(51) Int. Cl.
*A62C 37/12* (2006.01)
*A62C 2/24* (2006.01)
(Continued)

(52) U.S. Cl.
CPC ............. *A62C 37/12* (2013.01); *A62C 2/242* (2013.01); *F16H 25/16* (2013.01); *F16H 25/2018* (2013.01); *F16H 59/044* (2013.01); *F16H 59/64* (2013.01); *F16K 31/042* (2013.01); *F24F 11/30* (2018.01); *F24F 11/35* (2018.01); *F24F 11/64* (2018.01); *F24F 11/76* (2018.01); *H01H 1/5855* (2013.01); *H01H 33/28* (2013.01); *H01H 35/28* (2013.01); *H01H 37/00* (2013.01);
(Continued)

(58) Field of Classification Search
CPC ........ H01H 85/22; H01H 85/54; H01H 85/20; H01H 85/055; A62C 2/242; A62C 37/12; F24F 11/35; F24F 11/76; F24F 11/30; F24F 11/84; F24F 2110/10
See application file for complete search history.

(56) References Cited

U.S. PATENT DOCUMENTS 3,702,065 A * 11/1972 Jacobs .................. F25B 49/005
62/158
5,039,006 A * 8/1991 Habegger ............... F23N 5/242
236/11

(Continued)

*Primary Examiner* — Atif H Chaudry
(74) *Attorney, Agent, or Firm* — Foley & Lardner LLP

(57) ABSTRACT

An assembly includes a thermoelectric tripping device, a flange, and a gland. The thermoelectric tripping device is configured to be detachably coupled with a damper. The thermoelectric tripping device includes an extending arm including a fuse configured to trip at a pre-defined temperature. The flange is configured to be coupled to a surface of the damper. The gland is defined by a pair of fixtures positioned in-line with each other and having a passage configured therewithin to facilitate passage of the extending arm therethrough. A first fixture of the pair of fixtures is configured to be coupled with the flange, and a second fixture of the pair of fixtures is configured to be detachably coupled with the extending arm.

19 Claims, 11 Drawing Sheets

(51) Int. Cl.
*F16H 25/16* (2006.01)
*F16H 25/20* (2006.01)
*F16H 59/04* (2006.01)
*F16H 59/64* (2006.01)
*F16K 31/04* (2006.01)
*F24F 11/30* (2018.01)
*F24F 11/35* (2018.01)
*F24F 11/64* (2018.01)
*F24F 11/76* (2018.01)
*H01H 1/58* (2006.01)
*H01H 33/28* (2006.01)
*H01H 35/28* (2006.01)
*H01H 37/00* (2006.01)
*H01H 37/10* (2006.01)
*H01H 85/055* (2006.01)
*H01H 85/20* (2006.01)
*H01H 85/22* (2006.01)
*H01H 85/54* (2006.01)
*F16H 35/00* (2006.01)
*F24F 11/84* (2018.01)
*F24F 110/10* (2018.01)
*G05F 1/10* (2006.01)

(52) U.S. Cl.
CPC .......... *H01H 37/10* (2013.01); *H01H 85/055* (2013.01); *H01H 85/20* (2013.01); *H01H 85/22* (2013.01); *H01H 85/54* (2013.01); *F16H 25/20* (2013.01); *F16H 25/2015* (2013.01); *F16H 2025/2037* (2013.01); *F16H 2035/006* (2013.01); *F24F 11/84* (2018.01); *F24F 2110/10* (2018.01); *G05F 1/10* (2013.01)

(56) References Cited

U.S. PATENT DOCUMENTS

| | | | |
|---|---|---|---|
| 6,286,537 B1 * | 9/2001 | Backham | F24F 11/76 137/79 |
| 9,939,825 B2 | 4/2018 | Alexander | |
| 10,203,671 B2 | 2/2019 | Romanowich et al. | |
| 2017/0295058 A1 | 10/2017 | Gottschalk et al. | |
| 2020/0016030 A1 * | 1/2020 | Yli-Kovero | A61H 33/005 |

* cited by examiner

THERMOELECTRIC TRIPPING DEVICE AND COUPLING ARRANGEMENT THEREOF

CROSS-REFERENCE TO RELATED PATENT APPLICATION

This application claims the benefit of and priority to U.S. Provisional Application No. 62/990,202, filed Mar. 16, 2020, the entire disclose of which is incorporated by reference herein.

BACKGROUND

The present disclosure relates generally to actuators in a heating, ventilating, or air conditioning (HVAC) systems. The present disclosure relates more particularly to a thermoelectric tripping device and a coupling arrangement of said thermoelectric tripping device, affiliated to an actuator, with a damper. HVAC actuators are used to operate a wide variety of HVAC components such as air dampers, fluid valves, air handling units, and other components that are used in HVAC systems. For example, an actuator can be coupled to a damper in an HVAC system and can be used to drive the damper between an open position and a closed position. An HVAC actuator typically includes a motor and a drive device (e.g., a hub, a drive train) that is driven by the motor and coupled to the HVAC component.

Valves regulate, direct, and/or control the flow of a fluid (e.g., gases, liquids, fluidized solids, slurries) by opening, closing, or partially obstructing various passageways. Valves are often categorized based on the mechanism used to control fluid flow (e.g., ball valves, butterfly valves, choke valves, piston valves, plug valves, poppet valves). In some embodiments, the operating positions of the valve are binary (i.e., open or closed). In other embodiments, the valve may have any number of intermediate positions between a fully open position and a fully closed position.

Typically, dampers include a thermal release mechanism (TRM) of different type to ensure they displace towards a safety position in an eventuality of fire. However, in order to ensure proper and error free functioning it is required to periodically replace the thermal release mechanisms.

SUMMARY

One implementation of the present disclosure is an assembly, according to some embodiments. In some embodiments, the assembly includes a thermoelectric tripping device, a flange, and a gland. In some embodiments, the thermoelectric tripping device is configured to be detachably coupled with a damper. In some embodiments, the thermoelectric tripping device includes an extending arm including a fuse configured to trip at a pre-defined temperature. In some embodiments, the flange is configured to be coupled to a surface of the damper. In some embodiments, the gland is defined by a pair of fixtures positioned in-line with each other and having a passage configured therewithin to facilitate passage of the extending arm therethrough. In some embodiments, a first fixture of the pair of fixtures is configured to be coupled with the flange, and a second fixture of the pair of fixtures is configured to be detachably coupled with the extending arm.

In some embodiments, the second fixture includes a gripper a rotating member coupled with the gripper. In some embodiments, rotational movement of the rotating member manipulates a coverage of the gripper thereby enabling the gripper to either firmly grip the extending arm by reducing the coverage, or loosen the grip by increasing the coverage and enabling the extending arm and the thermoelectric tripping device to displace.

In some embodiments, increase in the coverage of the gripper enables the extending arm to axially rotate for docking of the thermoelectric tripping device as per space constraints.

In some embodiments, the gripper is a diaphragm based gripper.

In some embodiments, the flange is defined by a ring shank that forms a through-slot, and a wall extending from an operative top surface of the flange along a circumference of the through-slot.

In some embodiments, threads are defined on an inner surface of the flange, and threads are defined on an outer surface of the first fixture. In some embodiments, the threads on the inner surface of the flange have a threading direction opposite to that of the threads defined on the first fixture for coupling the flange with the gland.

In some embodiments, the inner surface of the flange is defined by an inner surface of the wall and an inner surface of the ring shank.

In some embodiments, the extending arm is configured to pass through the passage defined by the gland and the flange to enter a space defined within the damper, thereby enabling the fuse to trip at a pre-defined temperature.

In some embodiments, the flange includes at least one pair of holes. In some embodiments, each of the holes is configured to receive a fastener to facilitate secure mounting of the flange on the surface of the damper. In some embodiments, each of the pair of holes are positioned diametrically opposite to each other.

In some embodiments, a body of the thermoelectric tripping device is made from a flexible material.

In some embodiments, the damper is any of a fire damper, a smoke damper, or a fire damper and smoke damper.

Another implementation of the present disclosure is a thermoelectric tripping device for operating an actuator, according to some embodiments. In some embodiments, the thermoelectric tripping device includes a switch, an integrated port configured to facilitate providing power to the actuator, a first fuse, and a second fuse. In some embodiments, the first fuse is configured to be exposed to ambient conditions and trip at a pre-defined ambient temperature. In some embodiments, the second fuse is configured to be exposed within a duct and trip at a pre-defined duct temperature. In some embodiments, at least one of de-actuation of the switch, tripping of the first fuse, or tripping of the second fuse interrupts the power received by the actuator via the integrated port causing the actuator to operate in a safe mode.

In some embodiments, interruption in supply of the power causes the actuator to switch from an operating mode to the safe mode.

In some embodiments, the actuator is a spring return actuator and interruption of power causes the actuator to switch towards the safe mode by utilizing energy stored in a spring of the spring return actuator.

In some embodiments, the thermoelectric tripping device is defined by a unibody structure configured to integrate the switch, the first fuse, the second fuse, and the port. In some embodiments, the unibody structure is manufactured from a flexible material.

In some embodiments, the second fuse is disposed on an arm of the tripping device to facilitate the second fuse to access the duct.

In some embodiments, the pre-defined ambient temperature and the pre-defined duct temperate are same.

In some embodiments, the pre-defined ambient temperature and the pre-defined duct temperate are different.

In some embodiments, the thermoelectric tripping device further includes a diagnostic unit configured to inspect the status of the first fuse, the second fuse, the switch, and the actuator. In some embodiments, the diagnostic unit is configured to provide a visual indication based on inspection of the status of the first fuse, the second fuse, the switch, and the actuator. In some embodiments, the visual indication provided by the diagnostic unit is for at least one of or combination of actuator powered ON, actuator powered OFF, first fuse not tripped, second fuse not tripped, first fuse tripped, second fuse tripped, and switch de-actuated. In some embodiments, the diagnostic unit includes at least one LED configured to provide visual indications.

Another implementation of the present disclosure is a method for operating an actuator, according to some embodiments. In some embodiments, the method includes obtaining a status from a first fuse, the first fuse configured to be exposed to ambient conditions and trip at a pre-defined ambient temperature. In some embodiments, the method also includes obtaining a status from a second fuse, the second fuse configured to be exposed within a duct and trip at a pre-defined duct temperature. In some embodiments, the method also includes obtaining a status from a switch. In some embodiments, the method also includes interrupting power provided to the actuator based on at least one of the status of the first fuse, the status of the second fuse, or the status from the switch. In some embodiments, the first fuse and the second fuse are integrated in a unibody structure.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

Referring generally to the FIGURES, an HVAC valve/damper/actuator with a thermoelectric tripping device is shown, according to some embodiments.

The valves described herein may be used to regulate fluid flow from multiple fluid supplies and/or to multiple fluid returns. In some embodiments, the valve is a three-way valve having a valve body and a valve member. In other embodiments, the valve is a six-way valve having a valve body and a valve member. The valve body may include a valve chamber and a plurality of ports in fluid communication with the valve chamber (e.g., a first port, a second port, a third port). The valve may be controlled (e.g., by an actuator and/or a controller) by rotating the valve member within the valve chamber.

The actuator may be a damper actuator, a valve actuator, a fan actuator, a pump actuator, or any other type of actuator that can be used in an HVAC system. The actuator includes a motor and a drive device driven by the motor. In some embodiments, the motor is a brushless direct current (BLDC) motor. The drive device is coupled to a movable HVAC component for driving the movable HVAC component between multiple positions.

Advantageously, the thermoelectric tripping device of the present disclosure is compact, is durable, has quick response time, is precise, and provides a cost effective approach to test the functioning of the damper. Additionally, the arrangement for detachably coupling the thermoelectric tripping device with the damper facilitates hassle free replacement of the thermoelectric tripping device.

Replacement requirements for other thermal release mechanisms can generally cause high maintenance costs. Also, other methods to replace thermal release mechanisms can be tedious, time consuming, and laborious (e.g., to test functioning of an actuator that operates the damper). Still further, other thermoelectric tripping devices are secured to the dampers which prevents adjusting the placement of tripping devices as desired.

Various embodiments disclosed herein provide a thermoelectric tripping device and a coupling arrangement thereof which facilitates quick, accurate, and cost effective approach to test the functioning of actuator and also provide hassle free replacement of the thermoelectric tripping device. Advantageously, this facilitates easier installation and a more versatile adjustment of the thermoelectric tripping device, resulting in reduced costs associated with maintenance compared to other thermal release mechanisms.

HVAC Valve and Actuator Assemblies

Figure 1:
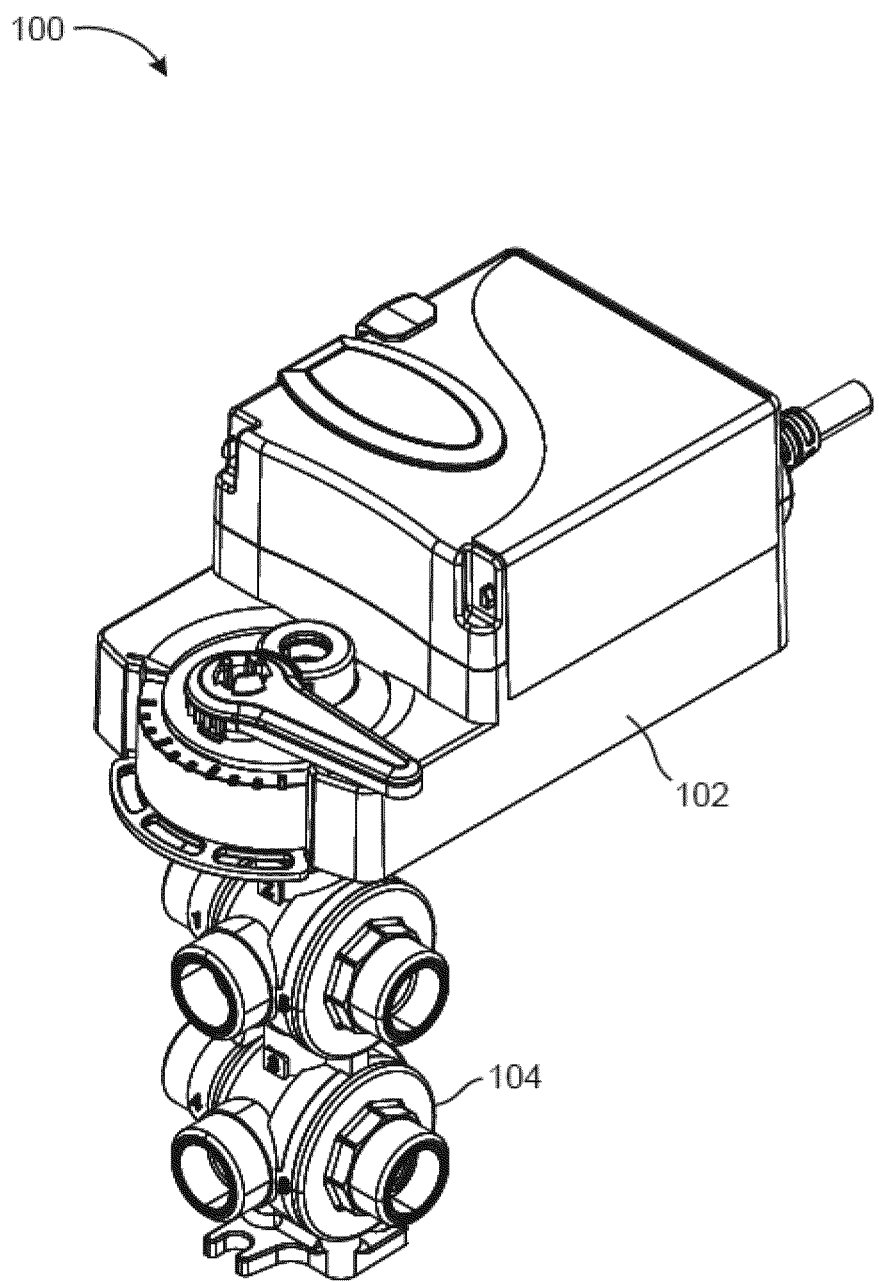
FIG. 1 is a perspective view of a valve and actuator assembly, according to some embodiments.

Referring now to FIG. 1, a view of an actuator and valve assembly 100 is shown, according to some embodiments. Assembly 100 may be used in an HVAC system, a waterside system, an airside system, or a building management system (BMS). Assembly 100 is shown to include an actuator 102 coupled to a six-way valve assembly 104. Actuator 102 may be configured to actuate a valve member of the six-way valve 104 and control fluid flow through the valve body to regulate a flow of fluid through a conduit, pipe, or tube.

Figure 2:
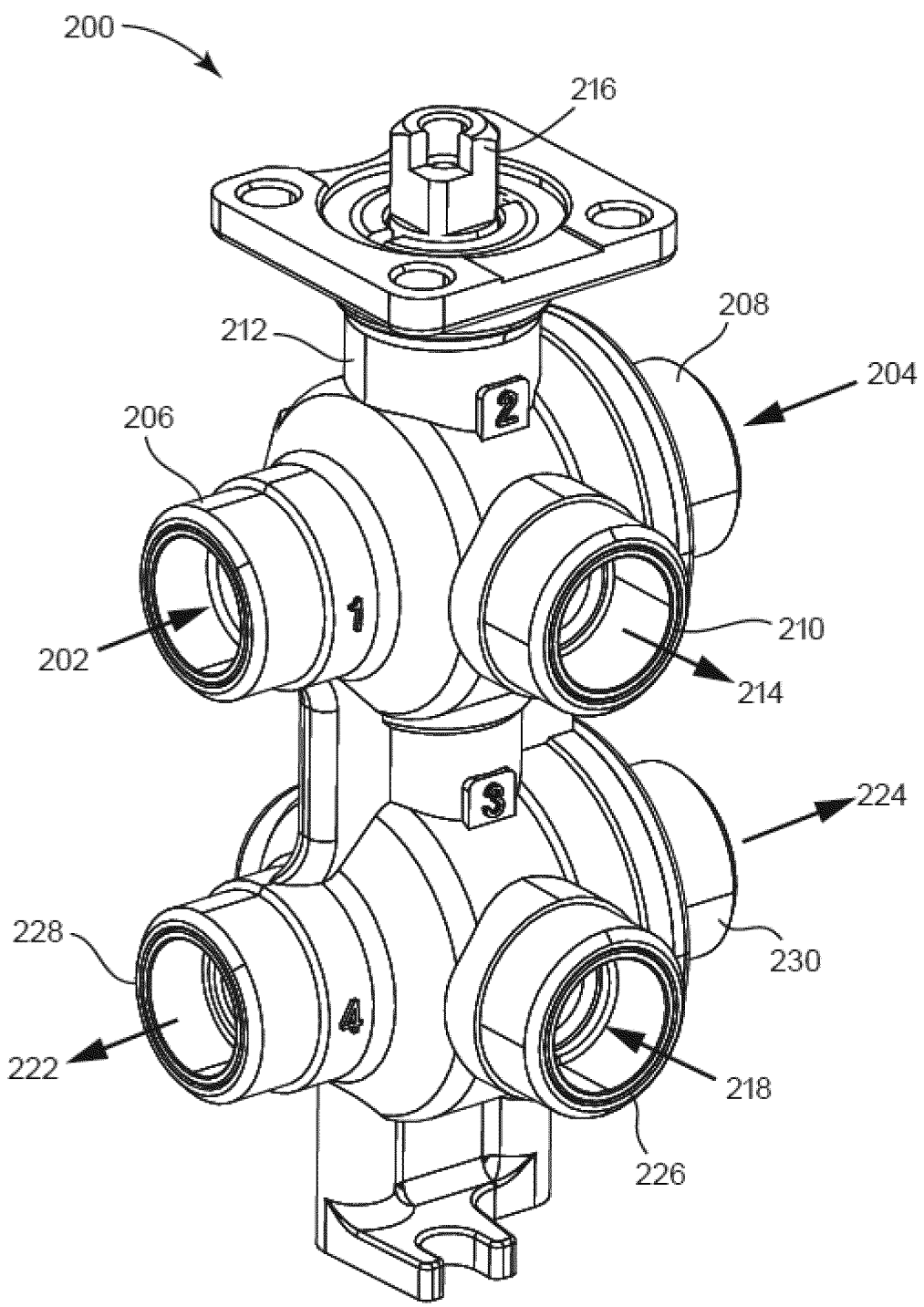
FIG. 2 is a perspective view of a six-way valve that can be implemented in the valve and actuator assembly of FIG. 1, according to some embodiments.

Referring now to FIG. 2, a six-way valve assembly 200 is shown according to an exemplary embodiment. In some embodiments, valve assembly 200 is identical or substantially similar to valve assembly 104 depicted in FIG. 1. Six-way valve assembly 200 is shown to include a six-way valve body 212 and a valve member 216. Six-way valve body 212 may combine two three-way valve bodies in a stacked orientation. In the stacked orientation, a single valve member 216 can be used to control fluid flow through both of the three-way valve bodies. Advantageously, six-way valve assembly 200 may be controlled by a single actuator (e.g., actuator 102) acting upon valve member 216.

Six-way valve assembly 200 may be used to switch between two fluid supplies and two fluid returns. For example, six-way valve assembly 200 may be configured to receive first fluid supply 202 at first supply port 206 and to receive second fluid supply 204 at second supply port 208. As shown, first port 206 and second port 208 may be inline ports (e.g., aligned with a common axis) and may be located on opposites sides of the valve chamber. Valve member 216 may be rotated to selectively control fluid flow from either first supply port 206 or second supply port 208 to outlet port 210 (e.g., without mixing).

Outlet port 210 may be a transverse port (e.g., not inline with ports 206 and 208). As shown, outlet port 210 is substantially perpendicular to ports 206 and 208 and in the same plane as ports 206 and 208. In other embodiments, outlet port 210 may be oriented at a variety of different angles relative to ports 206 and 208 and may not be in the same plane as ports 206 and 208. Outlet port 210 may connect to a fan coil unit (e.g., via a coil supply line). The fluid from outlet port 210 may pass through a fan coil unit and return to valve assembly 200 at return port 226. Valve member 216 may be rotated to selectively divert fluid from return port 226 to either first return port 228 or second return port 230. Return ports 228 and 230 may be fluidly connected to returns 222 and 224, respectively.

In various embodiments, the plurality of ports 206-230 may include any number of ports (e.g., two ports, three ports, four ports, six ports, twenty ports). Ports 206-230 may be configured to connect to pipes, tubes, or other fluid control components. Ports 206-230 may be configured to connect with fluid pipelines using threadings, compression fittings, glue, cement, flanges, welding, or other fasteners.

Valve body 212 may be made from any of a variety of materials including, for example, metals (e.g., cast iron, brass, bronze, steel, stainless steel, aluminum), plastics (e.g., PVC, PP, HDPE), glass-reinforced polymers (e.g., fiberglass), ceramics, or any combination thereof. The material or materials used to form valve body 212 may be based on the application for which valve body 212 is intended. For example, corrosion-resistant materials may be used for implementations in which valve body 212 is used with corrosive fluids (e.g., salt water, acidic fluids).

Still referring to FIG. 2, valve assembly 200 is shown to include valve member 216. Valve member 216 may include one or more ball members and a valve stem. The ball members may be substantially spherical. In various embodiments, the ball member may be fixedly attached to the valve stem or combined with the valve stem into a single component. The valve stem may extend through valve body 212 and connect to a handle or actuator for controlling the rotation of the valve member 216.

In operation, valve member 216 may be located at least partially within the internal valve chamber. Valve member 216 may be controllably movable (e.g., in rotation, in linear movement) relative to valve body 212 to modulate fluid flow through valve 200. By rotating valve member 216 relative to valve body 212, fluid flow can be selectively controlled (e.g., diverted, adjusted, increased, decreased) between the plurality of ports 206-230.

Each ball member may include a passage that permits fluid to flow through the ball member. In some embodiments, the passage is L-shaped (e.g., having two openings and a single ninety degree bend). The passage may be formed by drilling two bores into the ball member at approximately 90 degrees relative to each other. The bores may connect to form the passage through the ball member. Conventional ball valves may have bores with a substantially circular-shaped shaped cross section. In other embodiments, the passage may be T-shaped (e.g., having a main bore straight through the ball member and a second bore extending perpendicularly from one side of the main bore), X-shaped (e.g., having two bores extending through the ball member and intersecting as a ninety degree angle) or having any other shape.

The passage through the ball member may be controllably aligned (e.g., partially aligned, fully aligned) with ports 206-230 to form a fluid connection between pairs of ports. For example, the passage may be rotated into alignment with either first port 206 and third port 210, or second port 208 and third port 210. Under the six-way valve configuration of valve 200, the passage may additionally be rotated into alignment with either return port 226 and first return port 228, or return port 226 and second return port 230.

Figure 3:
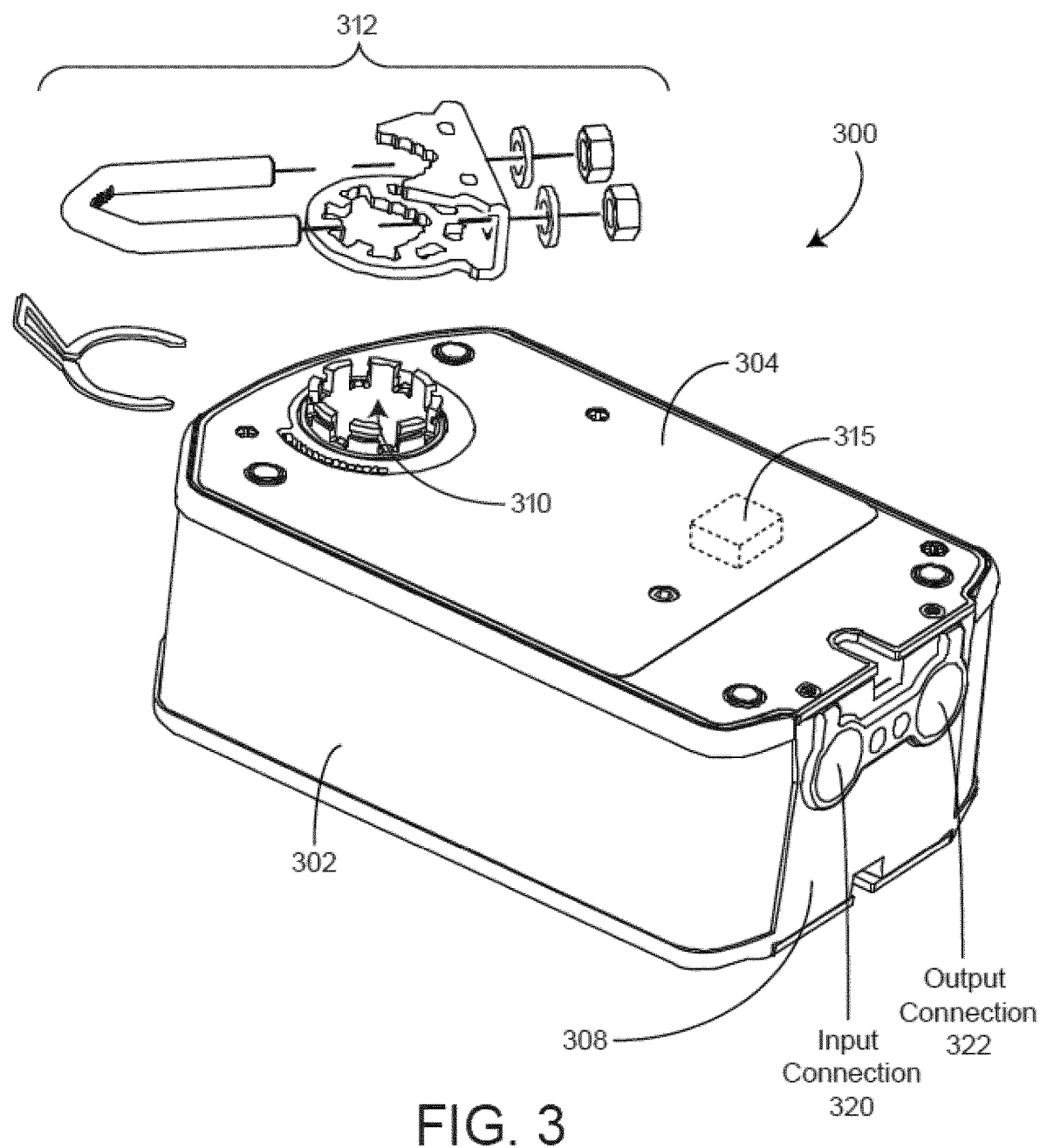
FIG. 3 is a perspective view of an actuator that can be implemented in the valve and actuator assembly of FIG. 1, according to some embodiments.
Figure 5:
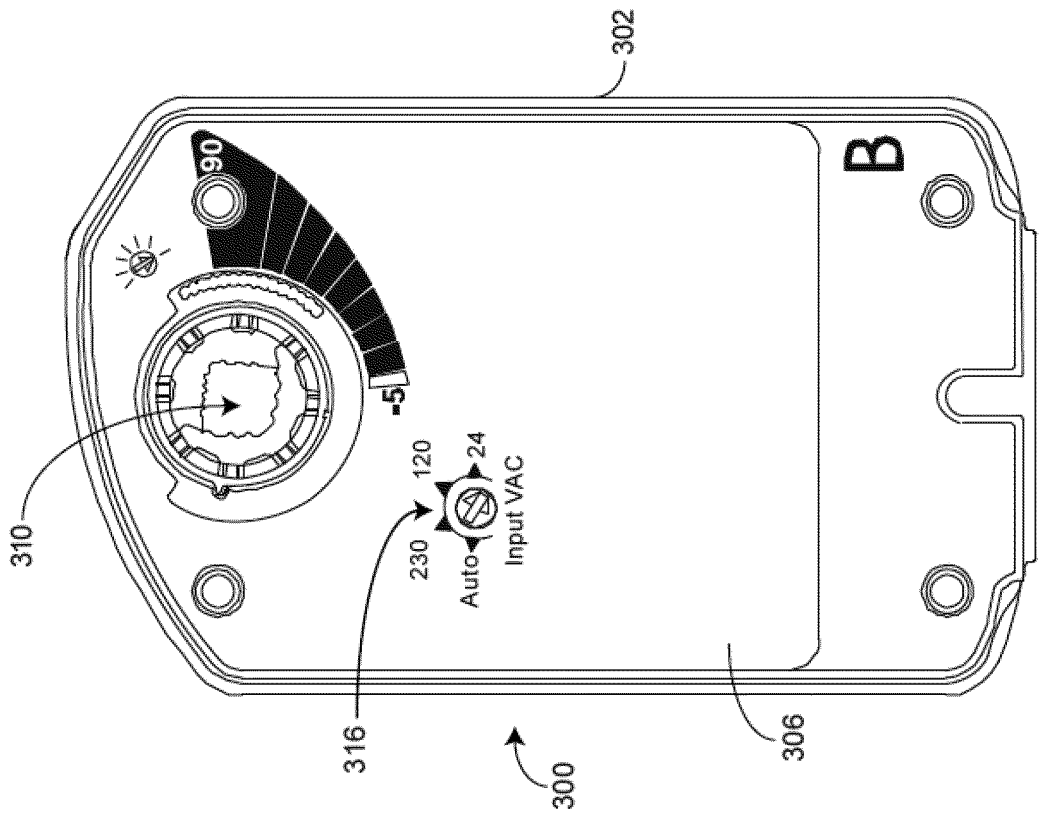
FIG. 5 is a bottom view of the actuator of FIG. 3, according to some embodiments.
Figure 4:
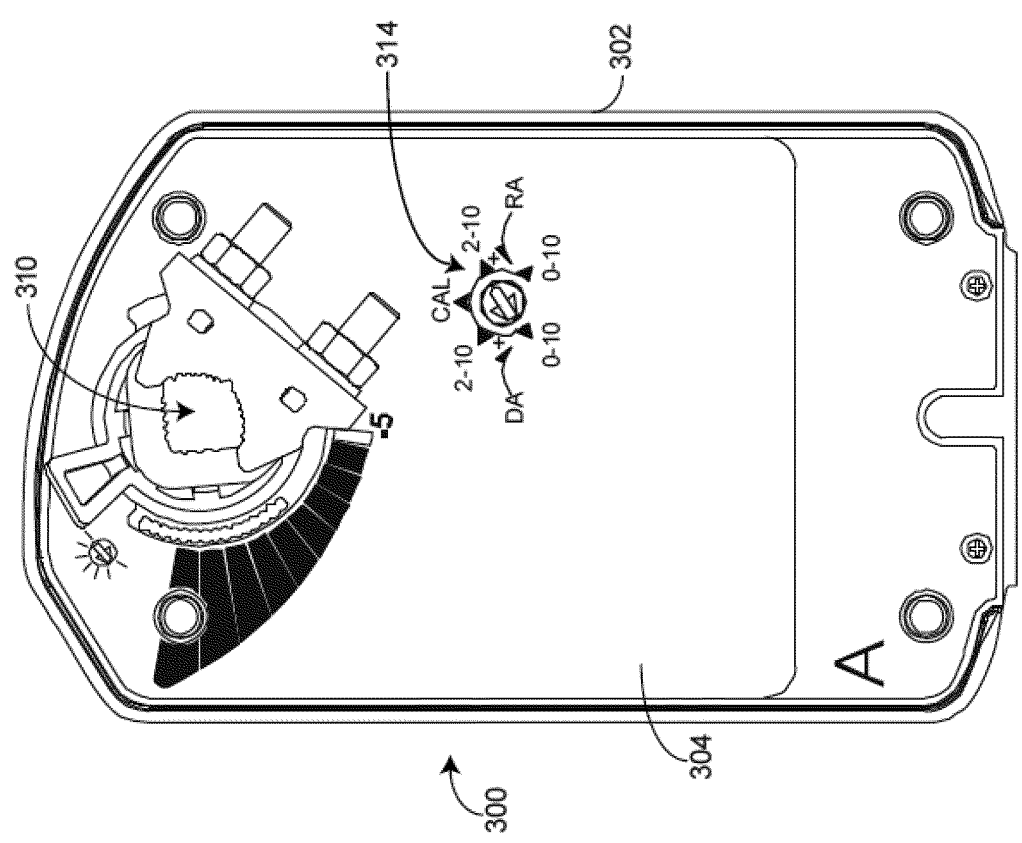
FIG. 4 is a top view of the actuator of FIG. 3, according to some embodiments.

Referring now to FIGS. 3-5, an actuator 300 for use in an HVAC system is shown, according to an exemplary embodiment. For example, actuator 300 may be a damper actuator, a valve actuator, a fan actuator, a pump actuator, or any other type of actuator that can be used in an HVAC system or BMS. In various embodiments, actuator 300 may be a linear actuator (e.g., a linear proportional actuator), a non-linear actuator, a spring return actuator, or a non-spring return actuator.

Actuator 300 is shown to include a housing 302 having a front side 304 (i.e., side A), a rear side 306 (i.e., side B) opposite front side 304, and a bottom 308. Housing 302 may contain the mechanical and processing components of actuator 300. In some embodiments, housing 302 contains a brushless direct current (BLDC) motor and a processing circuit configured to provide a pulse width modulated (PWM) DC output to control the speed of the BLDC motor. The processing circuit may be configured to compare a representation of the electric current output to the BLDC motor to a threshold and may hold the PWM DC output in an off state when the current exceeds the threshold. The processing circuit may also be configured to set the PWM DC output to zero and then ramp up the PWM DC output when actuator 300 approaches an end stop.

Actuator 300 is shown to include a drive device 310. Drive device 310 may be a drive mechanism, a hub, or other device configured to drive or effectuate movement of an HVAC system component. For example, drive device 310 may be configured to receive a shaft of a damper, a valve, or any other movable HVAC system component in order to drive (e.g., rotate) the shaft. In some embodiments, actuator 300 includes a coupling device 312 configured to aid in coupling drive device 310 to the movable HVAC system component. For example, coupling device 312 may facilitate attaching drive device 310 to a valve or damper shaft.

Actuator 300 is shown to include an input connection 320 and an output connection 322. In some embodiments, input connection 320 and output connection 322 are located along bottom 308. In other embodiments, input connection 320 and output connection 322 may be located along one or more other surfaces of housing 302. Input connection 320 may be configured to receive a control signal (e.g., a voltage input signal) from an external system or device. Actuator 300 may use the control signal to determine an appropriate PWM DC output for the BLDC motor. In some embodiments, the control signal is received from a controller such as an AHU controller, an economizer controller, a supervisory controller, a zone controller, a field controller, an enterprise level controller, a motor controller, an equipment-level controller (e.g., an actuator controller) or any other type of controller that can be used in an HVAC system or BMS.

In some embodiments, the control signal is a DC voltage signal. Actuator 300 may be a linear proportional actuator configured to control the position of drive device 310 according to the value of the DC voltage received at input connection 320. For example, a minimum input voltage (e.g., 0.0 VDC) may correspond to a minimum rotational position of drive device 310 (e.g., 0 degrees, —5 degrees), whereas a maximum input voltage (e.g., 10.0 VDC) may correspond to a maximum rotational position of drive device 310 (e.g., 90 degrees, 95 degrees). Input voltages between the minimum and maximum input voltages may cause actuator 300 to move drive device 310 into an intermediate position between the minimum rotational position and the maximum rotational position. In other embodiments, actuator 300 may be a non-linear actuator or may use different input voltage ranges or a different type of input signal (e.g., AC voltage or current) to control the position and/or rotational speed of drive device 310.

In some embodiments, the control signal is an AC voltage signal. Input connection 320 may be configured to receive an AC voltage signal having a standard power line voltage (e.g., 120 VAC or 230 VAC at 50/60 Hz). The frequency of the voltage signal may be modulated (e.g., by a controller for actuator 300) to adjust the rotational position and/or speed of drive device 310. In some embodiments, actuator 300 uses the voltage signal to power various components of actuator 300. Actuator 300 may use the AC voltage signal received via input connection 320 as a control signal, a source of electric power, or both. In some embodiments, the voltage signal is received at input connection 320 from a power supply line that provides actuator 300 with an AC voltage having a constant or substantially constant frequency (e.g., 120 VAC or 230 VAC at 50 Hz or 60 Hz). Input connection 320 may include one or more data connections (separate from the power supply line) through which actuator 300 receives control signals from a controller or another actuator (e.g., 0-10 VDC control signals).

In some embodiments, the control signal is received at input connection 320 from another actuator. For example, if multiple actuators are interconnected in a tandem arrangement, input connection 320 may be connected (e.g., via a communications bus) to the output data connection of another actuator. One of the actuators may be arranged as a master actuator with its input connection 320 connected to a controller, whereas the other actuators may be arranged as slave actuators with their respective input connections connected to the output connection 322 of the master actuator.

Output connection 322 may be configured to provide a feedback signal to a controller of the HVAC system or BMS in which actuator 300 is implemented (e.g., an AHU controller, an economizer controller, a supervisory controller, a zone controller, a field controller, an enterprise level controller). The feedback signal may indicate the rotational position and/or speed of actuator 300. In some embodiments, output connection 322 may be configured to provide a control signal to another actuator (e.g., a slave actuator) arranged in tandem with actuator 300. Input connection 320 and output connection 322 may be connected to the controller or the other actuator via a communications bus. The communications bus may be a wired or wireless communications link and may use any of a variety of disparate communications protocols (e.g., BACnet, LON, WiFi, Bluetooth, NFC, TCP/IP).

Still referring to FIGS. 3-5, actuator 300 is shown to include a first user-operable switch 314 located along front side 304 (shown in FIG. 4) and a second user-operable switch 316 located along rear side 306 (shown in FIG. 5). Switches 314-316 may be potentiometers or any other type of switch (e.g., push button switches such as switch 315, dials, flippable switches). Switches 314-316 may be used to set actuator 300 to a particular operating mode or to configure actuator 300 to accept a particular type of input. However, it should be understood that switches 314-316 are optional components and are not required for actuator 300 to perform the processes described herein. As such, one or more of switches 314-316 may be omitted without departing from the teachings of the present application.

Referring particularly to FIG. 4, switch 314 may be a mode selection switch having a distinct number of modes or positions. Switch 314 may be provided for embodiments in which actuator 300 is a linear proportional actuator that controls the position of drive device 310 as a function of a DC input voltage received at input connection 320. In some embodiments, the function of mode selection switch 314 is the same or similar to the function of the mode selection switch described in U.S. patent application Ser. No. 14/727,284, filed Jun. 1, 2015 (now U.S. Pat. No. 10,203,671), the entire disclosure of which is incorporated by reference herein. For example, the position of mode selection switch 314 may be adjusted to set actuator 300 to operate in a direct acting mode, a reverse acting mode, or a calibration mode.

Mode selection switch 314 is shown to include a 0-10 direct acting (DA) mode, a 2-10 DA mode, a calibration (CAL) mode, a 2-10 reverse acting (RA) mode, and a 0-10 RA mode. According to other exemplary embodiments, mode selection switch 314 may have a greater or smaller number of modes and/or may have modes other than listed as above. The position of mode selection switch 314 may define the range of DC input voltages that correspond to the rotational range of drive device 310. For example, when mode selection switch 314 is set to 0-10 DA, an input voltage of 0.0 VDC may correspond to 0 degrees of rotation position for drive device 310. For this same mode, an input voltage of 1.7 VDC may correspond to 15 degrees of rotation position, 3.3 VDC may correspond to 30 degrees of rotation position, 5.0 VDC may correspond to 45 degrees of rotation position, 6.7 VDC may correspond to 60 degrees of rotation position, 8.3 VDC may correspond to 75 degrees of rotation position, and 10.0 VDC may correspond to 90 degrees of rotation position. It should be understood that these voltages and corresponding rotational positions are merely exemplary and may be different in various implementations.

Referring particularly to FIG. 5, switch 316 may be a mode selection switch having a distinct number or modes or positions. Switch 316 may be provided for embodiments in which actuator 300 is configured to accept an AC voltage at input connection 320. In some embodiments, the function of mode selection switch 316 is the same or similar to the function of the mode selection switch described in U.S. patent application Ser. No. 14/475,141, filed Sep. 2, 2014 (now U.S. Pat. No. 9,939,825), the entire disclosure of which is incorporated by reference herein. For example, the position of switch 316 may be adjusted to set actuator 300 to accept various different AC voltages at input connection 320.

Mode selection switch 316 is shown to include a "24 VAC" position, a "120 VAC" position, a "230 VAC" position, an "Auto" position. Each position of switch 316 may correspond to a different operating mode. According to other exemplary embodiments, switch 316 may have a greater or lesser number of positions and/or may have modes other than the modes explicitly listed. The different operating modes indicated by switch 316 may correspond to different voltage reduction factors applied to the input voltage received at input connection 320. For example, with switch 316 in the 24 VAC position, actuator 300 may be configured to accept an input voltage of approximately 24 VAC (e.g., 20-30 VAC) at input connection 320 and may apply a reduction factor of approximately 1 to the input voltage. With switch 316 in the 120 VAC position, actuator 300 may be configured to accept an input voltage of approximately 120 VAC (e.g., 100-140 VAC, 110-130 VAC) at input connection 320 and may apply a reduction factor of approximately 5 (e.g., 3-7, 4-6, 4.5-5.5) to the input voltage. With switch 316 in the 230 VAC position, actuator 300 may be configured to accept an input voltage of approximately 230 VAC (e.g., 200-260 VAC, 220-240 VAC) at input connection 320 and may apply a reduction factor of approximately 9.6 (e.g., 7-13, 8-12, 9-10) to the input voltage. With switch 316 in the "Auto" position, actuator 300 may be configured automatically determine the input voltage received at input connection 320 and may adjust the voltage reduction factor accordingly.

Figure 6:
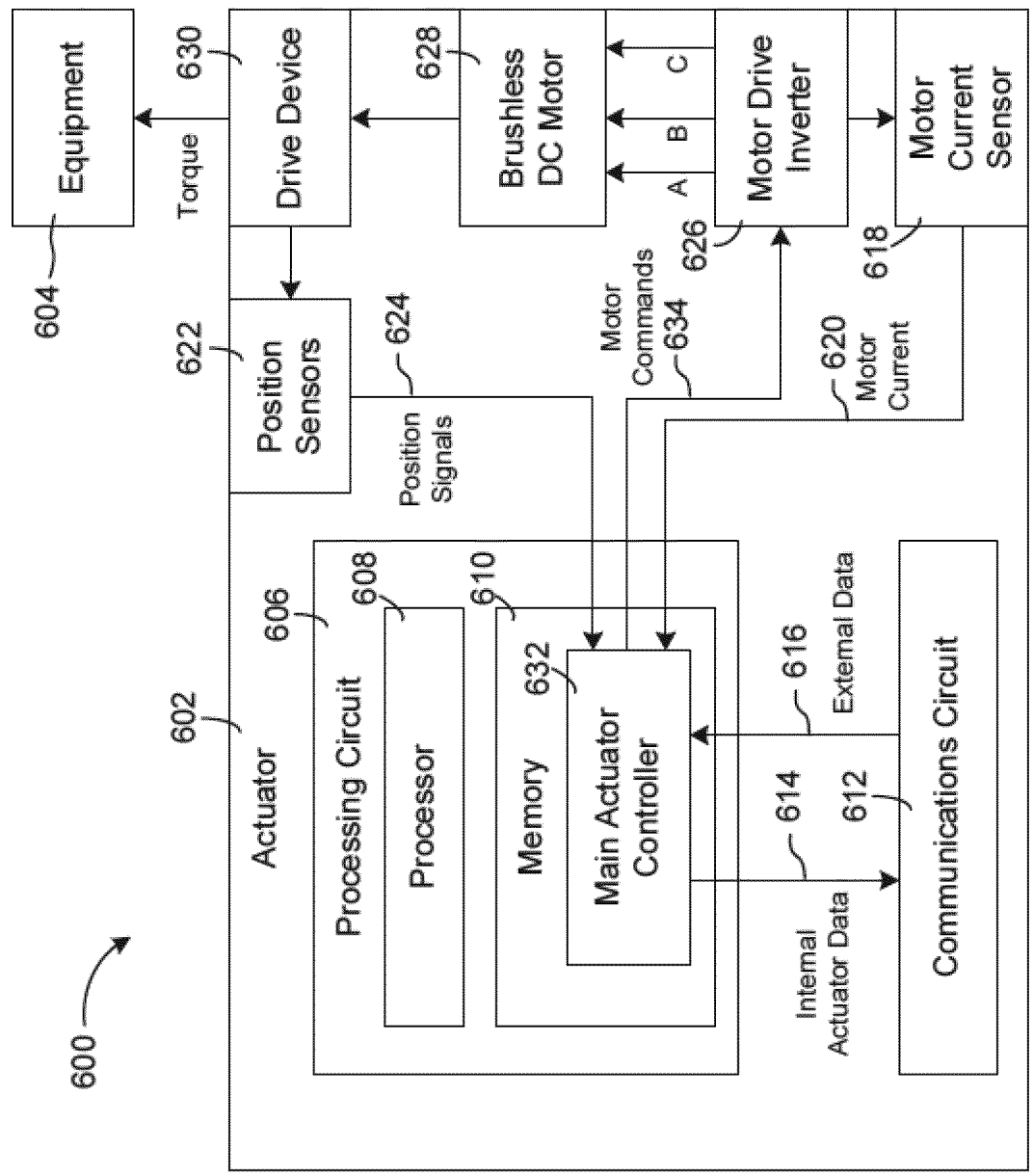
FIG. 6 is a block diagram of a smart actuator that can be implemented in the valve and actuator assembly of FIG. 1, according to some embodiments.
Figure 7:
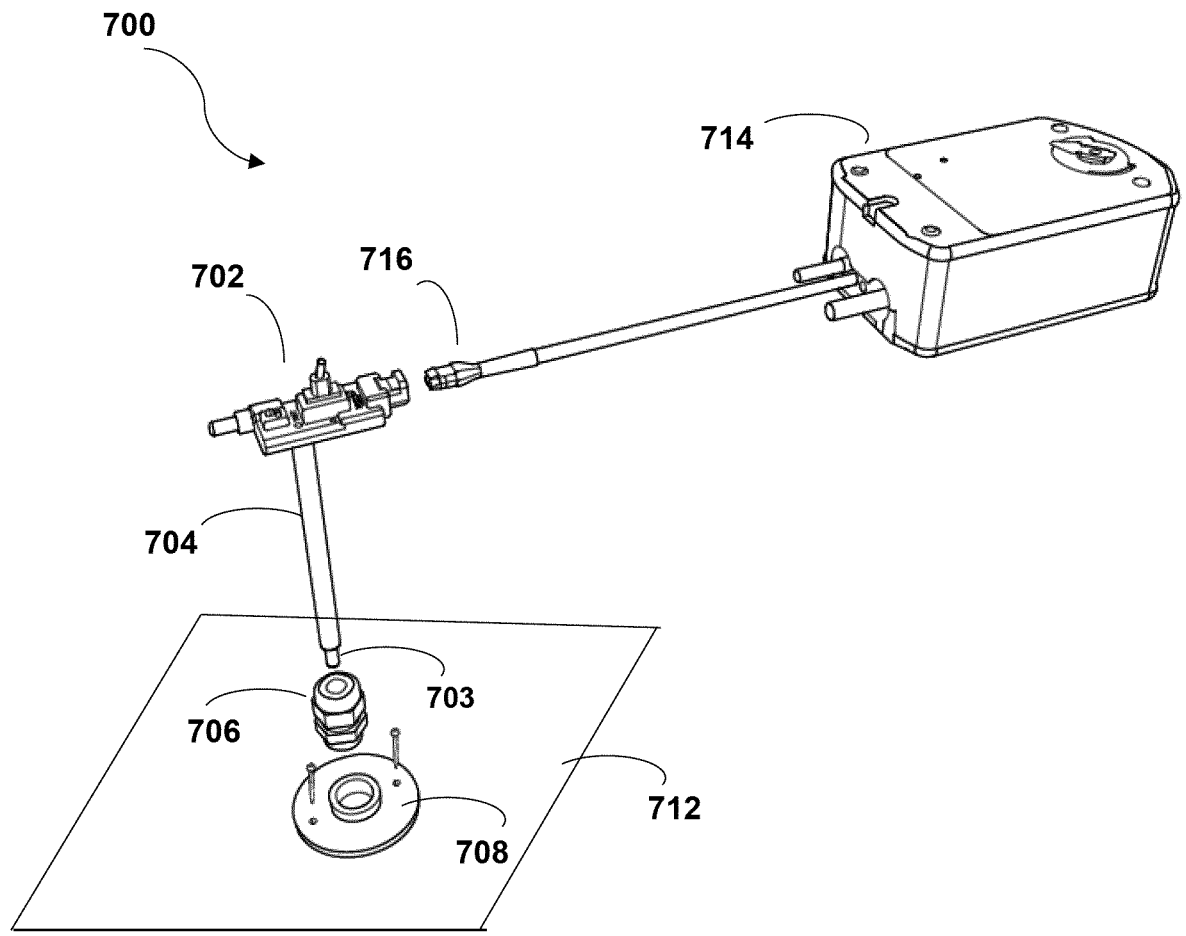
FIG. 7 is a schematic view depicting an arrangement for detachably attaching a thermoelectric tripping device with a damper, according to an embodiment.
Figure 8:
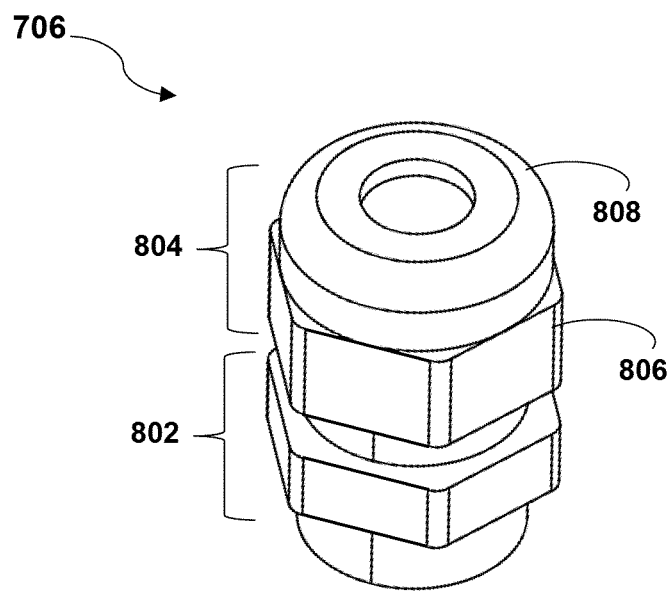
FIG. 8 is an isometric view of a gland employed for detachably attaching the thermoelectric device of FIG. 7, according to one embodiment.
Figure 9:
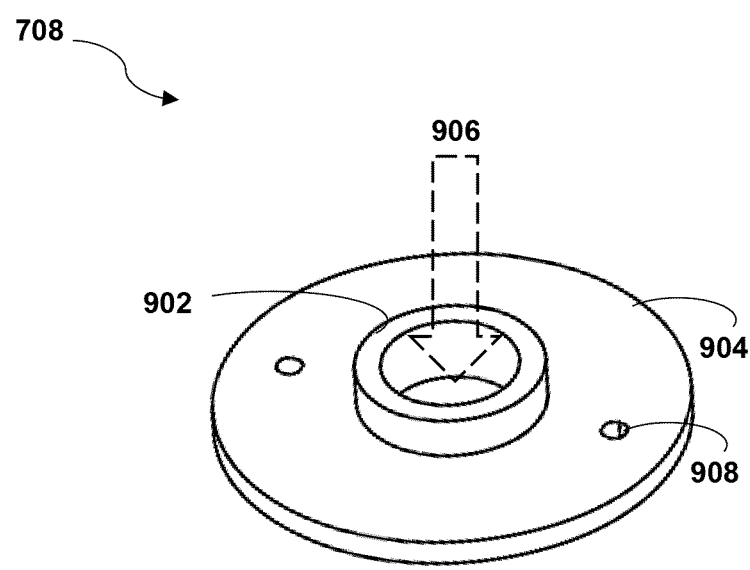
FIG. 9 is a perspective view of a flange employed for detachably attaching the thermoelectric device of FIG. 7, according to another embodiment.
Figure 10:
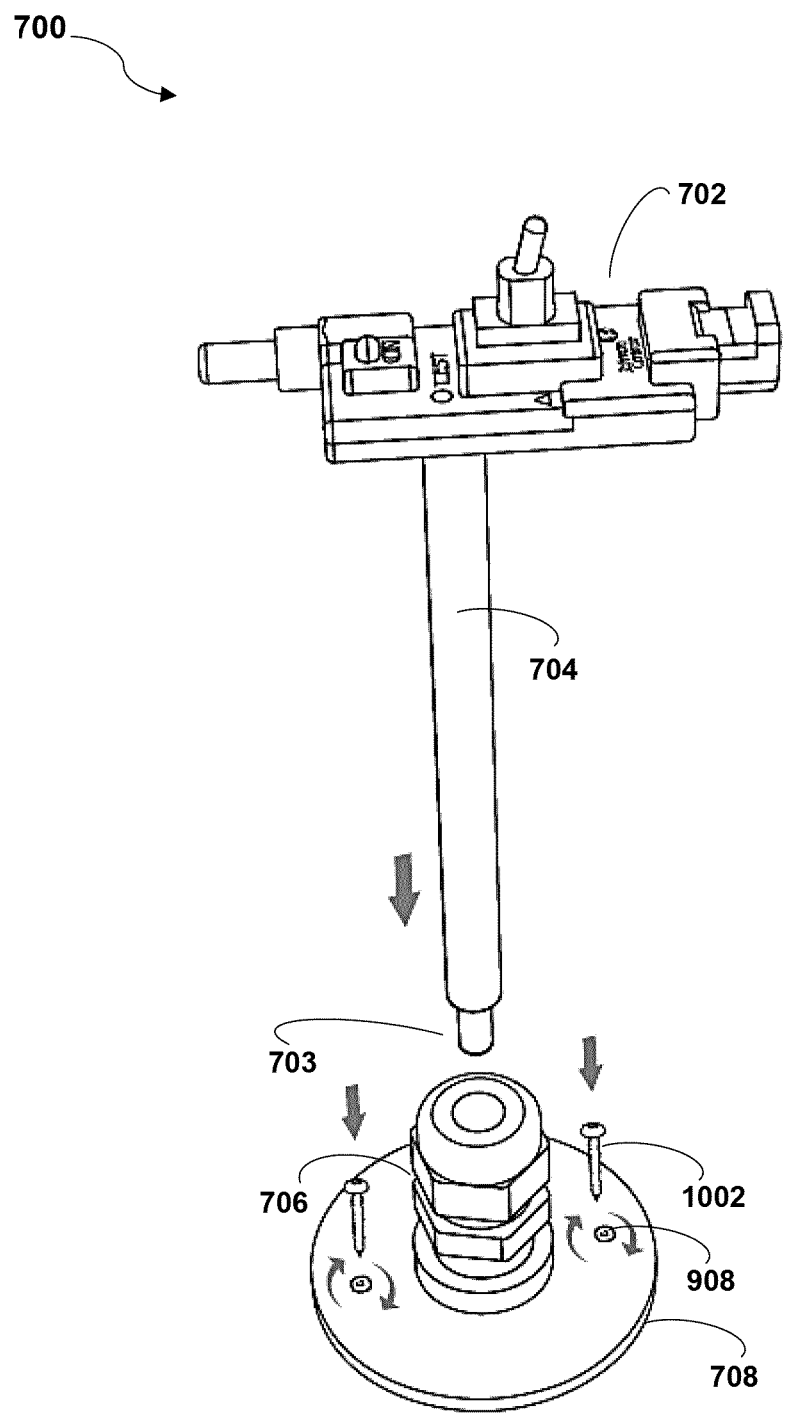
FIG. 10 is a perspective view depicting the gland of FIG. 8 and the flange of FIG. 9 for detachably attaching the thermoelectric tripping device with the damper, in accordance with an embodiment of the present disclosure.
Figure 11:
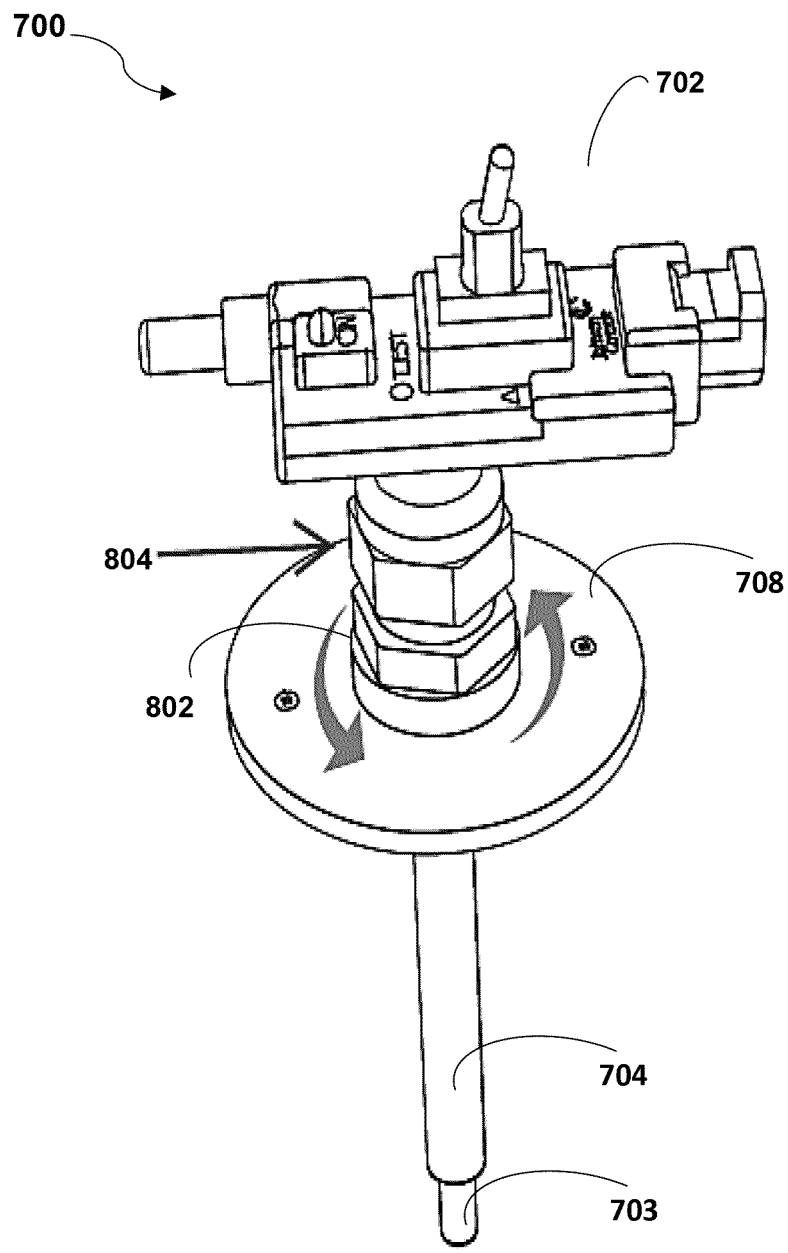
FIG. 11 is another perspective view depicting usage the gland of FIG. 8 and the flange of FIG. 9 for detachably attaching the thermoelectric tripping device with the damper, in accordance with an embodiment of the present disclosure.

Turning now to FIG. 6, a block diagram of a smart actuator device 600 is shown, according to some embodiments. Smart actuator device 600 may be an actuator that performs control loop functions. For example, applications of smart actuator 600 may include pressure disturbance rejections in actuator control, fan coil control, hydronic system control, 6-way ball valve control for chilled beams, distributed air handling unit (AHU) control, variable water flow (VWF) control, and water system (BEWS) control. Actuator 602 may be configured to operate equipment 604. Equipment 604 may include any type of device that can be operated by an actuator. In an exemplary embodiment, actuator 602 and equipment 604 (e.g., a valve) are packaged within a common integrated device chassis. In other embodiments, actuator 602 and equipment 604 are packaged as separate components.

Actuator 602 is shown to include a processing circuit 606 communicably coupled to BLDC motor 628. Processing circuit 606 is shown to include a processor 608, memory 610, and a main actuator controller 632. Processor 608 can be a general purpose or specific purpose processor, an application specific integrated circuit (ASIC), one or more field programmable gate arrays (FPGAs), a group of processing components, or other suitable processing components. Processor 608 can be configured to execute computer code or instructions stored in memory 610 or received from other computer readable media (e.g., CDROM, network storage, a remote server).

Memory 610 may include one or more devices (e.g., memory units, memory devices, storage devices) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 can be communicably connected to processor 608 via processing circuit 606 and may include computer code for executing (e.g., by processor 608) one or more processes described herein. When processor 608 executes instructions stored in memory 610, processor 608 generally configures actuator 602 (and more particularly processing circuit 606) to complete such activities.

Main actuator controller 632 may be configured to receive external control data 616 (e.g., position setpoints, speed setpoints) from communications circuit 612 and position signals 624 from position sensors 622. Main actuator controller 632 may be configured to determine the position of BLDC motor 628 and/or drive device 630 based on position signals 624. In some embodiments, main actuator controller 632 receives data from additional sources. For example, motor current sensor 618 may be configured to measure the electric current provided to BLDC motor 628. Motor current sensor 618 may generate a feedback signal indicating the motor current 620 and may provide this signal to main actuator controller 632 within processing circuit 608.

Still referring to FIG. 6, processing circuit 608 may be configured to output a PWM DC motor command 634 to control the speed of the BLDC motor. BLDC motor 628 may be configured to receive a three-phase PWM voltage output (e.g., phase A, phase B, phase C) from motor drive inverter 626. The duty cycle of the PWM voltage output may define the rotational speed of BLDC motor 628 and may be determined by processing circuit 606 (e.g., a microcontroller). Processing circuit 606 may increase the duty cycle of the PWM voltage output to increase the speed of BLDC motor 628 and may decrease the duty cycle of the PWM voltage output to decrease the speed of BLDC motor 628.

BLDC motor 628 may be coupled to drive device 630. Drive device 630 may be a drive mechanism, a hub, or other device configured to drive or effectuate movement of an HVAC system component (e.g., equipment 604). For example, drive device 630 may be configured to receive a shaft of a damper, a valve, or any other movable HVAC system component in order to drive (e.g., rotate) the shaft. In some embodiments, actuator 602 includes a coupling device configured to aid in coupling drive device 630 to the movable HVAC system component. For example, the coupling device may facilitate attaching drive device 630 to a valve or damper shaft.

Position sensors 622 may include Hall effect sensors, potentiometers, optical sensors, or other types of sensors configured to measure the rotational position of BLDC motor 628 and/or drive device 630. Position sensors 622 may provide position signals 624 to processing circuit 606. Main actuator controller 632 may use position signals 624 to determine whether to operate BLDC motor 628. For example, main actuator controller 632 may compare the current position of drive device 630 with a position setpoint received via external data input 616 and may operate BLDC motor 628 to achieve the position setpoint.

Actuator 602 is further shown to include a communications circuit 612. Communications circuit 612 may be a wired or wireless communications link and may use any of a variety of disparate communications protocols (e.g., BACnet, LON, WiFi, Bluetooth, NFC, TCP/IP). In some embodiments, communications circuit 612 is an integrated circuit, chip, or microcontroller unit (MCU) configured to bridge communications actuator 602 and external systems or devices. In some embodiments, communications circuit 612 is the Johnson Controls BACnet on a Chip (JBOC) product. For example, communications circuit 612 can be a pre-certified BACnet communication module capable of communicating on a building automation and controls network (BACnet) using a master/slave token passing (MSTP) protocol. Communications circuit 612 can be added to any existing product to enable BACnet communication with minimal software and hardware design effort. In other words, communications circuit 612 provides a BACnet interface for smart actuator device 600. Further details regarding the JBOC product are disclosed in U.S. patent application Ser. No. 15/207,431 filed Jul. 11, 2016, the entire disclosure of which is incorporated by reference herein.

Communications circuit 612 may also be configured to support data communications within actuator 602. In some embodiments, communications circuit 612 may receive internal actuator data 614 from main actuator controller 632. For example, internal actuator data 614 may include the sensed motor current 620, a measured or calculated motor torque, the actuator position or speed, configuration parameters, end stop locations, stroke length parameters, commissioning data, equipment model data, firmware versions, software versions, time series data, a cumulative number of stop/start commands, a total distance traveled, an amount of time required to open/close equipment 604 (e.g., a valve), or any other type of data used or stored internally within actuator 602. In some embodiments, communications circuit 612 may transmit external data 616 to main actuator controller 632. External data 616 may include, for example, position setpoints, speed setpoints, control signals, configuration parameters, end stop locations, stroke length parameters, commissioning data, equipment model data, actuator firmware, actuator software, or any other type of data which can be used by actuator 602 to operate BLDC motor 628 and/or drive device 630.

Arrangement for Detachably Attaching a Thermoelectric Tripping Device with a Damper Referring to FIG. 7 to FIG. 11, the present disclosure provides an assembly 700 for detachably attaching a thermoelectric tripping device 702 with a damper 712. In an embodiment, the damper 712 may be any of a fire damper, a smoke damper, or a fire and smoke damper. The thermoelectric tripping device 702 includes an extending arm 704, wherein the extending arm 704 is adapted to securely hold a fuse 703. In an embodiment, the fuse 703 may be a thermal fuse configured to trip at a pre-defined temperature.

In accordance with an embodiment of the present disclosure, the assembly 700 employs a flange 708 and a gland 706 (e.g., a coupler, a coupling, an attachment member, etc.). The flange 708 is configured to be securely mounted on a surface of the damper 712. In one embodiment, the flange 708 may be defined by a ring shank 904 forming a through-slot 906, and a wall 902 extending from an operative top surface of the flange 708 along the circumference of the through-slot 906 which may be on the inner periphery of the ring shank 904. Further, an inner surface of the flange 708 may be defined by the inner surface of the wall 902 and the inner surface of the ring shank 904. Additionally, a plurality of threads may be configured on an inner surface of the flange 708. In one implementation, at least one pair of holes 908 may be configured on the flange 708. A fastener 1002 may be passed through each of the holes 908 to facilitate secure mounting of the flange 708 on the surface of the damper 712. Specifically, each of the pair of holes 908 may be configured diametrical opposite to each other.

The gland 706, in some embodiments of the present disclosure, is defined by a pair of fixtures (802, 804) positioned in-line with each other, and having a passage configured therewithin to facilitate passage of the extending arm 704 therethrough.

In one implementation, a first fixture 802 of the pair of fixtures is configured to be coupled with the flange 708 and a second fixture 804 of the pair of fixtures is configured to detachably couple with the extending arm 704, thereby detachably coupling the thermoelectric tripping device 702 to damper 712. In an embodiment, the coupling between the flange 708 and the first fixture 802 may be a detachable coupling. Further, to enable coupling of the first fixture 802 with the flange 708, a plurality of threads is configured on an outer surface of the first fixture 802. In an embodiment, the plurality of threads may be configured on an operative bottom portion of the first fixture 802. Specifically, the threads on the inner surface of the flange 708 may have a threading direction opposite to that of the threads on the outer surface of the first fixture 802, thereby ensuring firm coupling between the gland 706 and flange 708. In an embodiment, the dimension of the threads on the inner surface of the flange 708 and the dimension of the threads on the outer surface of the first fixture 802 may be complementary to each other.

In accordance with an embodiment of the present disclosure, the second fixture 804 may include a gripper 808 and a rotating member 806. The rotating member 806 is connected with the gripper 808, wherein the rotational movement of the rotating member 806 is configured to manipulate the coverage of the gripper 808 thereby enabling the gripper 808 to either firmly grip the extending arm 704 or loosen the grip. In an embodiment, the clockwise rotation of the rotating member 806 may be configured to reduce the coverage of the gripper 808 thereby enabling the gripper 808 to firmly grip and restrict the movement of the extending arm 704. Further, the anticlockwise rotation of the rotating member 806 may be configured to increase the coverage of the gripper 808, thereby reducing the grip which may facilitate an operator to displace the extending arm 704 and therefore the thermoelectric tripping device 702 as per space constraints. In an alternate embodiment, the direction of rotation may be either clockwise or anticlockwise to vary the grip of the gripper 808. In still another embodiment, the rotating member 806 may be adapted to rotate in only one direction such that the rotation of the rotating member 806 in that particular direction will cause sequential increase and decrease in the coverage of the gripper 808.

In one embodiment of the present disclosure, the gripper may be diaphragm based gripper. In another embodiment, the gripper 808 may be implemented using a plurality of jaws. In still another embodiment, the gripper 808 may be implemented using a retractable medium having circular profile to encircle the extending arm 704.

In an operative configuration of the present disclosure, the thermoelectric tripping device 702 is detachably coupled with the damper 712. An actuator 714 is positioned in the proximity of the damper 712. In an embodiment, the actuator may be coupled to the damper 712. Further, a cable extending from the actuator 714, having a connector 716 is connected to a port of the thermoelectric tripping device 702. Further, the flange 708 is mounted on the surface of the damper 712 by means of fasteners 1002. The gland 706 is attached with the flange 708, wherein a passage is defined by the first and second fixtures of the gland 706 and the through-slot of the flange 708. Still further, the extending arm 704 of the thermoelectric tripping device 702 is traversed via the passage to enter the space defined within the damper 712 thereby exposing the fuse 703, attached to the extending arm 704, to internal duct temperature. Subsequent to the thermoelectric tripping device 702 abutting the gland 706, the rotating member 806 of the gland 706 is rotated to manipulate the coverage of the gripper 808 and firmly grip the extending arm 704 passing therethrough. Alternatively, in order to adjust the position of the thermoelectric tripping device 702, the rotating member 806 of the gland 706 may be again rotated in an opposite direction to increase the coverage of the gripper 808 and loosening its grip on the extending arm 704.

In accordance with an embodiment of the present disclosure, the assembly 700 described hereinabove facilitates 360 degrees freedom of rotation to the thermoelectric tripping device 702. In other words, the thermoelectric tripping device is configured to rotate 360 degrees while mounted.

In an embodiment, the body of the thermoelectric tripping device 702 is made of a flexible material to facilitate breakage free handling.

The assembly 700 for detachably coupling the thermoelectric tripping device 702 provides following advantages:
- provides quick and easy replacement of the thermoelectric tripping device 702;
- eliminates the need of unscrewing damper while replacing the thermoelectric tripping device 702;
- facilitates tool free replacement;
- eliminates the need of skilled labors;
- allows 360° axial rotation even after installation of the thermoelectric tripping device 702; and
- enable modifying the position of the thermoelectric tripping device 702 to adapt to space constraints even without tooling or modifying original screw position in the damper.

Thermoelectric Tripping Device

Figure 12:
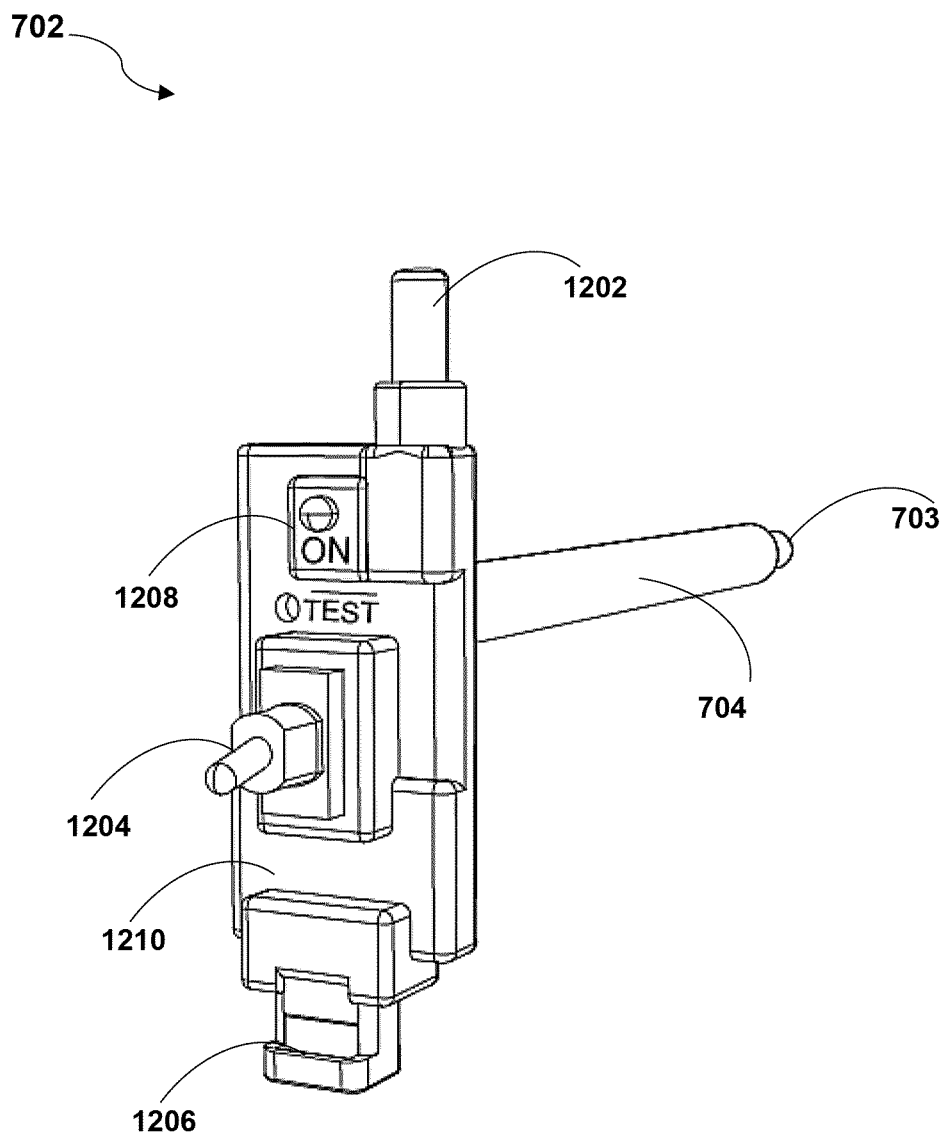
FIG. 12 is an isometric view of a thermoelectric tripping device, in accordance with an embodiment.
Figure 13:
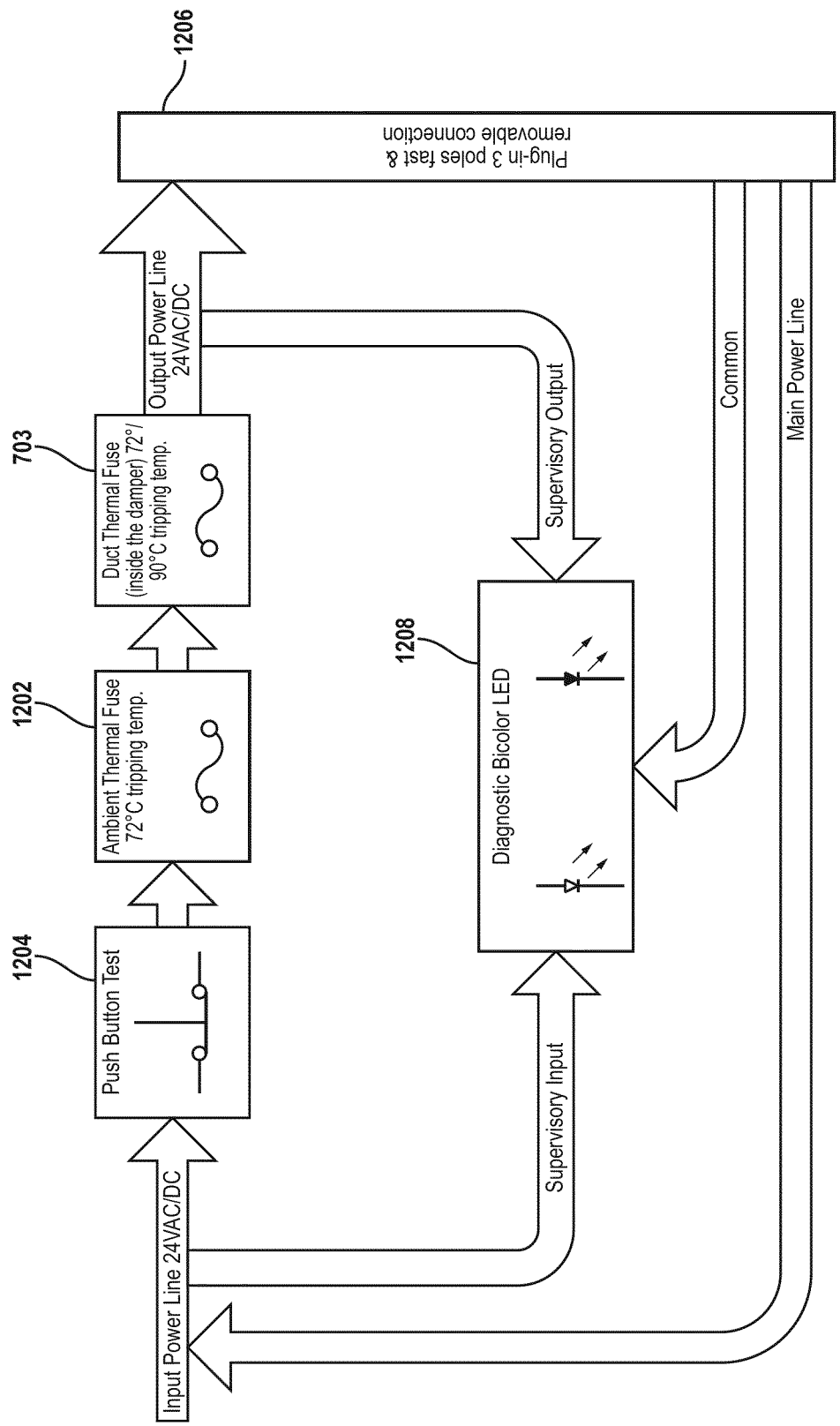
FIG. 13 is a block diagram of the thermoelectric tripping device of FIG. 12, according to some embodiments.

Referring now to FIGS. 12-13, in accordance with an aspect of the present disclosure, a thermoelectric tripping device 702 is provided.

In some embodiment, the thermoelectric tripping device (hereinafter referred as device) 702 includes a switch 1204, an integrated port 1206, a first fuse 1202, and a second fuse 703. The device 702 is defined by a unibody structure integrating the switch 1204, the port 1206 (also referred as "integrated port"), a first fuse 1202, and a second fuse 703 (also referred as fuse hereinabove). In an embodiment, the thermoelectric tripping device 702 includes an extending arm 704 that may be adapted to secure the second fuse 703. The second fuse 703 is associated with the duct temperature, and is configured to trip at a pre-defined duct temperature. Additionally, the first fuse 1202 may also extend from the body of the thermoelectric tripping device 702, and may be associated with the ambient temperature, wherein the first fuse 1202 may be configured to trip at a pre-defined ambient temperature.

In accordance with an embodiment of the present disclosure, the unibody structure of the device 702 provides in high degree of Ingress Protection (IP).

In an embodiment, the tripping temperature of the first fuse 1202 and the second fuse 703 are the same. In another embodiment, the tripping temperature of the first fuse 1202 and the second fuse 703 are different.

In another embodiment, the integrated port 1206 is configured to facilitate a connection with the actuator 714. In an embodiment, the actuator 714 is a spring return actuator.

In some embodiments, the switch 1204 may be a push button switch which may be configured to be de-actuated upon pressing. In this embodiment, the switch may be a normally closed switch.

Specifically, the switch 1204, the first fuse 1202, and the second fuse 703 may be serially connected with each other, wherein actuation of the switch 1204, and non-tripping state of the first fuse 1202 and the second fuse 703 may facilitate flow of power/current towards the actuator 714. Additionally, either de-actuation of the switch 1204, or tripping of at least one of the first fuse 1202 and the second fuse 703 may break the connection and interrupt the supply of power to the actuator resulting in actuator 714 entering in safe mode by utilizing the energy stored within the spring of the actuator 714.

In still another embodiment of the present disclosure, the thermoelectric tripping device 702 includes a diagnostic unit 1208. The diagnostic unit 1208 is configured to inspect the status of the first fuse 1202, the second fuse 703, the switch 1204, and the actuator 714. Further, the diagnostic unit 1208 may be configured to provide visual indications based on the inspection of the status of the first fuse 1202, the second fuse 703, the switch 1204, and the actuator 714.

In an embodiment, the diagnostic unit 1208 may be enabled to provide visual notifications depicting the status of each of the first fuse 1202, the second fuse 703, the switch 1204, and the actuator 714. In some embodiment, the diagnostic unit 1208 may be enabled to provide visual notifications/indications for at least one of or combination of actuator powered ON, actuator powered OFF, first fuse not tripped, second fuse not tripped, first fuse tripped, second fuse tripped, and switch de-actuated.

In an exemplary embodiment, the diagnostic unit 1208 may include at least one LED for providing visual notifications. The LED's may be mono color LED's wherein each LED corresponds to one or more of the visual notification. Alternatively, the diagnostic unit 1208 may include one or more multi-color LED to provide color based indications/notifications, wherein each color corresponds to a particular notification.

In an operative configuration, the cable extending from the actuator 714 is a multi-wired cable, wherein a first wire is enabled to carry power supply towards the thermoelectric tripping device 702, a second wire is enabled to carry power back towards the actuator 714, and a third wire is enabled to communicate with the diagnostic unit 1208. The cable is connected to the integrated port 1206. The power supplied via the first wire is allowed to pass through the switch 1204, the first fuse 1202, and the second fuse 703, and subsequently via the second cable towards the actuator motor. In one aspect, in order to perform a maintenance test on the actuator 714, the switch 1204 is pressed which breaks the power supply towards the actuator 714 forcing the actuator to change its state based on the energy stored within the spring. In an alternate aspect, when the ambient temperature is equal to or greater than the pre-defined temperature, the first fuse 1202 trips resulting in irreversible power cut-off and forcing the actuator 714 to change its state based on the energy stored within the spring. In still another aspect, when the duct temperature is equal to or greater than the pre-defined temperature, the second fuse 703 trips resulting in irreversible power cut-off and forcing the actuator 714 to change its state based on the energy stored within the spring.

In an embodiment, the pre-defined ambient temperature and the pre-defined duct temperature may be in the range of 70 degrees Celsius to 95 degrees Celsius.

In accordance with an embodiment of the present disclosure, the actuator 714 associated with the thermoelectric tripping device 702 may be enabled to operate either the damper or the valve disclosed in the preceding sections.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the apparatus, system, assembly, etc., as shown in the various exemplary embodiments is illustrative only. Additionally, any element disclosed in one embodiment may be incorporated or utilized with any other embodiment disclosed herein. It should be appreciated that other elements of the various embodiments may be incorporated or utilized with any of the other embodiments disclosed herein.

What is claimed is:

1. An assembly comprising:
    a thermoelectric tripping device configured to be detachably coupled with a damper, the thermoelectric tripping device comprising an extending arm including a fuse configured to trip at a pre-defined temperature;
    a flange configured to be coupled to a surface of the damper; and
    a gland configured to removably couple with the flange and the extending arm, the gland defined by a pair of fixtures positioned in-line with each other and having a passage configured therewithin to facilitate insertion and removal of the extending arm therethrough, wherein a first fixture of the pair of fixtures is configured to be coupled with the flange, and a second fixture of the pair of fixtures is configured to be detachably coupled with the extending arm.

2. The assembly of claim 1, wherein the second fixture comprises:
    a gripper; and
    a rotating member coupled with the gripper, wherein rotational movement of the rotating member manipulates a coverage of the gripper thereby enabling the gripper to either firmly grip the extending arm by reducing the coverage, or loosen the grip by increasing the coverage and enabling the extending arm and the thermoelectric tripping device to displace.

3. The assembly of claim 2, wherein increase in the coverage of the gripper enables the extending arm to axially rotate for docking of the thermoelectric tripping device as per space constraints.

4. The assembly of claim 2, wherein the gripper is a diaphragm based gripper.

5. The assembly of claim 1, wherein the flange is defined by a ring shank that forms a through-slot, and a wall extending from an operative top surface of the flange along a circumference of the through-slot.

6. The assembly of claim 5, wherein a plurality of threads is defined on an inner surface of the flange, and a plurality of threads is defined on an outer surface of the first fixture, wherein the threads on the inner surface of the flange have a threading direction opposite to that of the threads defined on the first fixture for coupling the flange with the gland.

7. The assembly of claim 6, wherein the inner surface of the flange is defined by an inner surface of the wall and an inner surface of the ring shank.

8. The assembly of claim 1, wherein the extending arm is configured to pass through the passage defined by the gland and the flange to enter a space defined within the damper, thereby enabling the fuse to trip at a pre-defined temperature.

9. The assembly of claim 1, wherein the flange comprises at least one pair of holes, wherein each of the holes is configured to receive a fastener to facilitate secure mounting of the flange on the surface of the damper, wherein each of the pair of holes are positioned diametrically opposite to each other.

10. The assembly of claim 1, wherein a body of the thermoelectric tripping device is made from a flexible material.

11. The assembly of claim 1, wherein the damper is any of a fire damper, a smoke damper, or a fire damper and smoke damper.

12. A thermoelectric tripping device for operating an actuator, the thermoelectric tripping device comprising:
    a switch;
    an integrated port configured to facilitate providing power to the actuator;
    a first fuse configured to be exposed to ambient conditions and trip at a pre-defined ambient temperature; and
    a second fuse configured to be exposed within a duct and trip at a pre-defined duct temperature;
    wherein at least one of de-actuation of the switch, tripping of the first fuse, or tripping of the second fuse interrupts the power received by the actuator via the integrated port causing the actuator to operate in a safe mode;
    wherein the thermoelectric tripping device is defined by a unibody structure configured to integrate the switch, the first fuse, the second fuse, and the port, wherein the unibody structure is manufactured from a flexible material.

13. The thermoelectric tripping device of claim 12, wherein interruption in supply of the power causes the actuator to switch from an operating mode to the safe mode.

14. The thermoelectric tripping device of claim 12, wherein the actuator is a spring return actuator and interruption of power causes the actuator to switch towards the safe mode by utilizing energy stored in a spring of the spring return actuator.

15. The thermoelectric tripping device of claim 12, wherein the second fuse is disposed on an arm of the tripping device to facilitate the second fuse to access the duct.

16. The thermoelectric tripping device of claim 12, wherein the pre-defined ambient temperature and the pre-defined duct temperate are same.

17. The thermoelectric tripping device of claim 12, wherein the pre-defined ambient temperature and the pre-defined duct temperate are different.

18. The thermoelectric tripping device of claim 12, further comprising a diagnostic unit configured to inspect the status of the first fuse, the second fuse, the switch, and the actuator, and further configured to provide a visual indication based on inspection of the status of the first fuse, the second fuse, the switch, and the actuator, wherein the visual indication provided by the diagnostic unit is for at least one of or combination of actuator powered ON, actuator powered OFF, first fuse not tripped, second fuse not tripped, first fuse tripped, second fuse tripped, and switch de-actuated, wherein the diagnostic unit comprises at least one LED configured to provide visual indications.

19. A method for operating an actuator, the method comprising:
- obtaining a status from a first fuse of a thermoelectric tripping device, the first fuse configured to be exposed to ambient conditions and trip at a pre-defined ambient temperature;
- obtaining a status from a second fuse, the second fuse configured to be exposed within a duct and trip at a pre-defined duct temperature;
- obtaining a status from a switch; and
- interrupting power provided to the actuator based on at least one of the status of the first fuse, the status of the second fuse, or the status from the switch;
- wherein the thermoelectric tripping device is defined by a unibody structure configured to integrate the switch, the first fuse, and the second fuse, wherein the unibody structure is manufactured from a flexible material.

* * * * *